United States Patent
Moshiri et al.

(10) Patent No.: US 9,369,659 B2
(45) Date of Patent: Jun. 14, 2016

(54) POINTING CAPABILITY AND ASSOCIATED USER INTERFACE ELEMENTS FOR TELEVISION USER INTERFACES

(75) Inventors: Negar Moshiri, Bethesda, MD (US); Frank J. Wroblewski, Gaithersburg, MD (US); William J. Napier, Germantown, MD (US); Frank A. Hunleth, Rockville, MD (US); Daniel S. Simpkins, Bethesda, MD (US); Kevin M. Conroy, Rockville, MD (US); Peter Wood, Frederick, MD (US); Neel Goyal, Reston, VA (US); Jason Witenstein-Weaver, Baltimore, MD (US); Adam Mark, Bethesda, MD (US); Scott Anthony Stanchfield, Germantown, MD (US)

(73) Assignee: HILLCREST LABORATORIES, INC., Rockville, MD (US)

(*) Notice: Subject to any disclaimer, the term of this patent is extended or adjusted under 35 U.S.C. 154(b) by 18 days.

(21) Appl. No.: 13/112,803

(22) Filed: May 20, 2011

(65) Prior Publication Data

US 2011/0219395 A1    Sep. 8, 2011

Related U.S. Application Data

(62) Division of application No. 11/895,412, filed on Aug. 24, 2007, now abandoned.

(60) Provisional application No. 60/823,870, filed on Aug. 29, 2006.

(51) Int. Cl.
*H04N 7/16* (2011.01)
*G06F 3/00* (2006.01)
(Continued)

(52) U.S. Cl.
CPC .............. *H04N 5/76* (2013.01); *G11B 27/034* (2013.01); *G11B 27/34* (2013.01); *H04N 5/44543* (2013.01); *H04N 21/4147* (2013.01); *H04N 21/42206* (2013.01); *H04N 21/4312* (2013.01); *H04N 21/4583* (2013.01); *H04N 21/478* (2013.01); *H04N 21/4753* (2013.01); *H04N 21/4755* (2013.01); *H04N 21/47214* (2013.01); *H04N 21/47217* (2013.01); *H04N 21/482* (2013.01); *H04N 21/4825* (2013.01); *H04N 21/4852* (2013.01); *H04N 5/4403* (2013.01);
(Continued)

(58) Field of Classification Search
None
See application file for complete search history.

(56) References Cited

U.S. PATENT DOCUMENTS

| 4,745,402 A | 5/1988 | Auerbach |
|---|---|---|
| 5,045,843 A | 9/1991 | Hansen |

(Continued)

FOREIGN PATENT DOCUMENTS

| GB | 2 237 911 A | 5/1991 |
|---|---|---|
| WO | 98/43183 | 10/1998 |

(Continued)

OTHER PUBLICATIONS

Quesenbery, W., et al., Designing for Interactive Television, http://www.wqusability.com/articles/itv-design.html, 1996, pp. 1-6.

(Continued)

*Primary Examiner* — Jonathan V Lewis
(74) *Attorney, Agent, or Firm* — Patent Portfolio Builders PLLC

(57) ABSTRACT

Systems and methods according to the present invention provide a user interface for television control functionality.

14 Claims, 15 Drawing Sheets

(51) Int. Cl.

| | | |
|---|---|---|
| *G06F 13/00* | (2006.01) | |
| *H04N 5/445* | (2011.01) | |
| *H04N 5/76* | (2006.01) | |
| *G11B 27/034* | (2006.01) | |
| *G11B 27/34* | (2006.01) | |
| *H04N 21/472* | (2011.01) | |
| *H04N 21/4147* | (2011.01) | |
| *H04N 21/475* | (2011.01) | |
| *H04N 21/482* | (2011.01) | |
| *H04N 21/422* | (2011.01) | |
| *H04N 21/431* | (2011.01) | |
| *H04N 21/458* | (2011.01) | |
| *H04N 21/478* | (2011.01) | |
| *H04N 21/485* | (2011.01) | |
| *H04N 5/44* | (2011.01) | |
| *H04N 21/433* | (2011.01) | |

(52) U.S. Cl.
CPC .... *H04N 21/4334* (2013.01); *H04N 2005/4412* (2013.01)

(56) References Cited

U.S. PATENT DOCUMENTS

| | | | |
|---|---|---|---|
| 5,341,466 A | 8/1994 | Perlin et al. | |
| 5,359,348 A | 10/1994 | Pilcher et al. | |
| 5,524,196 A | 6/1996 | Blades | |
| 5,532,754 A * | 7/1996 | Young et al. | 725/47 |
| 5,638,523 A | 6/1997 | Mullet et al. | |
| 5,671,342 A | 9/1997 | Millier et al. | |
| 5,684,525 A * | 11/1997 | Klosterman | 725/48 |
| 5,701,424 A | 12/1997 | Atkinson | |
| 5,706,448 A | 1/1998 | Blades | |
| 5,745,710 A | 4/1998 | Clanton, III et al. | |
| 5,790,121 A | 8/1998 | Sklar et al. | |
| 5,793,438 A | 8/1998 | Bedard | |
| 5,796,395 A | 8/1998 | de Hond | |
| 5,808,608 A * | 9/1998 | Young | G04G 15/006 348/563 |
| 5,835,156 A * | 11/1998 | Blonstein et al. | 725/38 |
| 5,912,612 A | 6/1999 | DeVolpi | |
| 5,940,072 A | 8/1999 | Jahanghir et al. | |
| 5,955,988 A | 9/1999 | Blonstein et al. | |
| 5,978,043 A | 11/1999 | Blonstein et al. | |
| 5,982,369 A | 11/1999 | Sciammarella et al. | |
| 6,002,394 A | 12/1999 | Schein et al. | |
| 6,005,578 A | 12/1999 | Cole | |
| 6,016,144 A | 1/2000 | Blonstein et al. | |
| 6,037,933 A | 3/2000 | Blonstein et al. | |
| 6,049,823 A | 4/2000 | Hwang | |
| 6,057,831 A | 5/2000 | Harms et al. | |
| 6,072,484 A * | 6/2000 | Kuroda | G06F 17/247 715/799 |
| 6,088,031 A | 7/2000 | Lee et al. | |
| 6,092,076 A | 7/2000 | McDonough et al. | |
| 6,141,003 A * | 10/2000 | Chor et al. | 715/719 |
| 6,154,199 A | 11/2000 | Butler | |
| 6,154,723 A | 11/2000 | Cox et al. | |
| 6,175,362 B1 | 1/2001 | Harms et al. | |
| 6,181,333 B1 | 1/2001 | Chaney et al. | |
| 6,191,781 B1 | 2/2001 | Chaney et al. | |
| 6,195,089 B1 | 2/2001 | Chaney et al. | |
| 6,268,849 B1 | 7/2001 | Boyer et al. | |
| 6,295,646 B1 | 9/2001 | Goldschmidt Iki | |
| 6,314,575 B1 | 11/2001 | Billock et al. | |
| 6,330,858 B1 | 12/2001 | McDonough et al. | |
| 6,346,956 B2 | 2/2002 | Matsuda | |
| 6,349,257 B1 | 2/2002 | Liu et al. | |
| 6,369,837 B1 | 4/2002 | Schirmer | |
| 6,385,542 B1 | 5/2002 | Millington | |
| 6,397,387 B1 | 5/2002 | Rosin et al. | |
| 6,400,406 B1 | 6/2002 | Kim | |
| 6,411,308 B1 | 6/2002 | Blonstein et al. | |
| 6,412,110 B1 | 6/2002 | Schein et al. | |
| 6,415,225 B1 | 7/2002 | Hiyokawa et al. | |
| 6,421,067 B1 | 7/2002 | Kamen et al. | |
| 6,426,761 B1 | 7/2002 | Kanevsky et al. | |
| 6,429,813 B2 | 8/2002 | Fiegen | |
| 6,437,836 B1 * | 8/2002 | Huang et al. | 348/734 |
| 6,452,609 B1 | 9/2002 | Katinsky et al. | |
| 6,505,348 B1 * | 1/2003 | Knowles et al. | 725/49 |
| 6,529,218 B2 | 3/2003 | Ogawa et al. | |
| 6,577,350 B1 | 6/2003 | Proehl et al. | |
| 6,621,452 B2 | 9/2003 | Knockeart et al. | |
| 6,642,939 B1 * | 11/2003 | Vallone et al. | 715/721 |
| 6,735,777 B1 | 5/2004 | Kim | |
| 6,753,849 B1 | 6/2004 | Curran et al. | |
| 6,765,598 B2 | 7/2004 | Kim | |
| 6,819,344 B2 | 11/2004 | Robbins | |
| 6,993,722 B1 * | 1/2006 | Greer et al. | 715/739 |
| 7,010,492 B1 | 3/2006 | Bassett et al. | |
| 7,093,201 B2 | 8/2006 | Duarte | |
| 7,139,983 B2 | 11/2006 | Kelts | |
| 7,158,118 B2 | 1/2007 | Liberty | |
| 7,236,156 B2 | 6/2007 | Liberty | |
| 7,239,301 B2 | 7/2007 | Liberty | |
| 7,499,027 B2 * | 3/2009 | Brigham et al. | 345/158 |
| 7,562,376 B2 * | 7/2009 | Matsuzaki | 725/43 |
| 7,757,252 B1 * | 7/2010 | Agasse | 725/41 |
| 8,307,397 B2 * | 11/2012 | Park | H04N 5/44513 725/59 |
| 8,850,478 B2 * | 9/2014 | Moshiri | H04N 5/44513 725/39 |
| 8,869,206 B2 * | 10/2014 | Bae | H04N 5/44543 348/570 |
| 2001/0011373 A1 * | 8/2001 | Inoue | 725/50 |
| 2001/0016947 A1 * | 8/2001 | Nishikawa et al. | 725/51 |
| 2001/0049826 A1 | 12/2001 | Wilf | |
| 2002/0033848 A1 | 3/2002 | Sciammarella et al. | |
| 2002/0040475 A1 | 4/2002 | Yap et al. | |
| 2002/0054129 A1 | 5/2002 | Heron et al. | |
| 2002/0054158 A1 | 5/2002 | Asami | |
| 2002/0112237 A1 | 8/2002 | Kelts | |
| 2002/0126121 A1 | 9/2002 | Robbins | |
| 2002/0129366 A1 | 9/2002 | Schein et al. | |
| 2002/0174430 A1 * | 11/2002 | Ellis et al. | 725/46 |
| 2003/0046694 A1 * | 3/2003 | Istvan et al. | 725/39 |
| 2003/0046700 A1 | 3/2003 | Wilcox et al. | |
| 2003/0079227 A1 | 4/2003 | Knowles et al. | |
| 2003/0095156 A1 | 5/2003 | Klein et al. | |
| 2003/0160812 A1 * | 8/2003 | Dommer et al. | 345/721 |
| 2003/0169299 A1 | 9/2003 | Kusano et al. | |
| 2003/0206719 A1 | 11/2003 | Bumgardner et al. | |
| 2004/0003412 A1 * | 1/2004 | Halbert | 725/112 |
| 2004/0040039 A1 * | 2/2004 | Bernier | 725/46 |
| 2004/0107442 A1 | 6/2004 | Bayley | |
| 2004/0123320 A1 | 6/2004 | Daily et al. | |
| 2004/0168187 A1 * | 8/2004 | Chang | 725/40 |
| 2004/0250278 A1 * | 12/2004 | Imai et al. | 725/40 |
| 2004/0252119 A1 | 12/2004 | Hunleth et al. | |
| 2004/0268393 A1 | 12/2004 | Hunleth et al. | |
| 2005/0002649 A1 | 1/2005 | Boyle et al. | |
| 2005/0010964 A1 | 1/2005 | Sano et al. | |
| 2005/0015803 A1 * | 1/2005 | Macrae et al. | 725/41 |
| 2005/0097474 A1 | 5/2005 | Accot | |
| 2005/0188402 A1 | 8/2005 | De Andrade et al. | |
| 2005/0210501 A1 | 9/2005 | Zigmond et al. | |
| 2005/0210503 A1 * | 9/2005 | Tsuji | 725/37 |
| 2005/0251825 A1 * | 11/2005 | Fukuda et al. | 725/44 |
| 2005/0253806 A1 | 11/2005 | Liberty et al. | |
| 2006/0020962 A1 | 1/2006 | Stark et al. | |
| 2006/0028446 A1 | 2/2006 | Liberty | |
| 2006/0037047 A1 | 2/2006 | DeYonker et al. | |
| 2006/0053388 A1 | 3/2006 | Michelman | |
| 2006/0101504 A1 * | 5/2006 | Aravamudan et al. | 725/136 |
| 2006/0117342 A1 | 6/2006 | Park et al. | |
| 2006/0123449 A1 | 6/2006 | Ma et al. | |
| 2006/0184966 A1 * | 8/2006 | Hunleth et al. | 725/39 |
| 2006/0195512 A1 | 8/2006 | Rogers et al. | |
| 2006/0225095 A1 * | 10/2006 | Tsunokawa et al. | 725/47 |
| 2006/0250358 A1 | 11/2006 | Wroblewski | |
| 2006/0262116 A1 | 11/2006 | Moshiri | |

(56) References Cited

U.S. PATENT DOCUMENTS

| | | | |
|---|---|---|---|
| 2006/0267995 A1* | 11/2006 | Radloff et al. | 345/530 |
| 2006/0294558 A1 | 12/2006 | Morris et al. | |
| 2007/0018952 A1* | 1/2007 | Arseneau | G06F 1/1626 |
| | | | 345/156 |
| 2007/0035518 A1 | 2/2007 | Francz | |
| 2007/0266411 A1 | 11/2007 | Yamamoto et al. | |
| 2008/0010518 A1 | 1/2008 | Jiang et al. | |
| 2008/0065989 A1 | 3/2008 | Conroy et al. | |
| 2009/0249393 A1* | 10/2009 | Shelton et al. | 725/39 |
| 2009/0265245 A1 | 10/2009 | Wright | |
| 2011/0093875 A1* | 4/2011 | Simmons et al. | 725/5 |

FOREIGN PATENT DOCUMENTS

| | | |
|---|---|---|
| WO | 2005124519 A1 | 12/2005 |
| WO | 2006088831 A2 | 8/2006 |

OTHER PUBLICATIONS

Prasar, V., "Technology to the aid of science popularisation", http://www.vigyanprazar.com/dream/jan99/janvpinsight.htm, Jan. 1999, pp. 1-2.

Press Release, "NetTV Selected for 800 Kansas City Classrooms", http://www.fno.org/mar98/NKCSDPR1.html, Mar. 23, 1998, pp. 1-2.

Fuerst, J., et al., "Interactive Television: A Survey of the State of Research and the Proposal and Evaluation of a User Interface," http://wwwai.wu-wien.ac.at/~koch/stud/itv/paper.html, Jun. 1996, pp. 1-11.

Bier, E., et al., "Toolglass and Magic Lenses: The See-Through Interface", Proceedings of Siggraph 93, Computer Graphics Annual Conference Series, ACM, Aug. 1993, pp. 73-80.

Stone, M., et al., "The Movable Filter as a User Interface Tool", Proceedings of CHI '94, ACM, Apr. 24-28, 1994, pp. 306-312.

Bier, E., et al., "A Taxonomy of See-Through Tools", Proceedings of CHI '94, ACM, Apr. 24-28, 1994, pp. 358-364.

Fishkin, K., et al. "Enhanced Dynamic Queries via Movable Filters", Conference Paper, CHI '95 Proceedings of the Special Interest Group on Computer-Human Interaction (SIGCHI), pp. 415-420, ISBN: 0-201-847055-1, copyrighted 1995.

Bederson, B., "Quantum Treemaps and Bubblemaps for a Zoomable Image Browser", UIST 2001, ACM Symposium on User Interface Software and Technology, CHI Letters 3(2), pp. 71-80.

International Search Report and Written Opinion issued in corresponding International Application No. PCT/US04/014487, mailed Feb. 9, 2005.

Verhoeven, A., et al. "Hypermedia on the Map: Spatial Hypermedia in HyperMap", International Conference on Information, Communications and Signal Processing, ICICS '97, Singapore, Sep. 9-12, 1997, pp. 589-592.

International Search Report issued in corresponding International Application No. PCT/US01/08377, mailed Jul. 25, 2005.

International Search Report issued in corresponding International Application No. PCT/US01/08331, mailed Nov. 13, 2002.

International Search Report issued in corresponding International Application No. PCT/US01/08261, mailed Aug. 5, 2002.

English translation of Second Office Action issued on Dec. 31, 2010 in corresponding Chinese Patent Application No. 200780040241.7.

English translation/summation of Office Action issued Jun. 12, 2010 in corresponding Chinese Patent Application No. 200780040241.7.

International Search Report issued on Jun. 17, 2008 in corresponding International Application No. PCT/US07/18792.

Written Opinion issued on Jun. 17, 2008 in corresponding International Application No. PCT/US07/18792.

International Search Report issued on Jul. 25, 2005 in corresponding International Application No. PCT/US01/08377.

International Search Report issued on Nov. 13, 2002 in corresponding International Application no. PCT/US01/08331.

International Search Report issued on Jul. 25, 2002 in corresponding International Application No. PCT/US01/08261.

\* cited by examiner

POINTING CAPABILITY AND ASSOCIATED USER INTERFACE ELEMENTS FOR TELEVISION USER INTERFACES

RELATED APPLICATION

This application is related to, and claims priority from, U.S. Provisional Patent Application Ser. No. 60/823,870 filed on Aug. 29, 2006, entitled "Graphical User Interface", the disclosure of which is incorporated here by reference.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

In addition to being able to navigate through and select media items, such as movies, music, photos and personal videos, another feature which is likely to become increasingly popular with consumers is the capability to point at a television and interact with user interface elements displayed thereon via pointing. Pointing provides a powerful interactive tool, familiar to those who have used computers, and avoids the problems with the "up/down/left/right" paradigm described above. The introduction of pointing into user interfaces which enable users to interact with the television and associated devices, will in turn drive demand for new and creative user interface elements.

SUMMARY

According to an exemplary embodiment, a television system includes a television, a user interface for controlling output of media via the television, the user interface being displayed on the television and including a channel changing element which overlays video being output on the television, and a pointing device for providing pointing and selection inputs to the user interface by interacting with the channel changing element to enable selection of a new channel for outputting the video.

According to another exemplary embodiment, a method for controlling a television includes displaying a user interface for changing channels on the television, providing input to the user interface by pointing at a user interface element overlaid on video being displayed on the television using a pointing device, and controlling media output on the television based on the input.

According to yet another exemplary embodiment, a television system includes a television, a user interface for controlling output of media via the television, the user interface being displayed on the television and including a user interface view which enables a user to change settings associated with the user interface; and a pointing device for providing pointing and selection inputs to the user interface by interacting with the user interface view to enable selection of settings for the user interface.

According to still another exemplary embodiment, a method for controlling a television includes displaying a user interface for controlling output of media via the television, the user interface being displayed on the television and including a user interface view which enables a user to change settings associated with the user interface, and receiving pointing and selection inputs to the user interface to enable selection of settings for the user interface.

BRIEF DESCRIPTION OF THE DRAWINGS

The accompanying drawings illustrate exemplary embodiments of the present invention, wherein.

DETAILED DESCRIPTION

Figure 1:
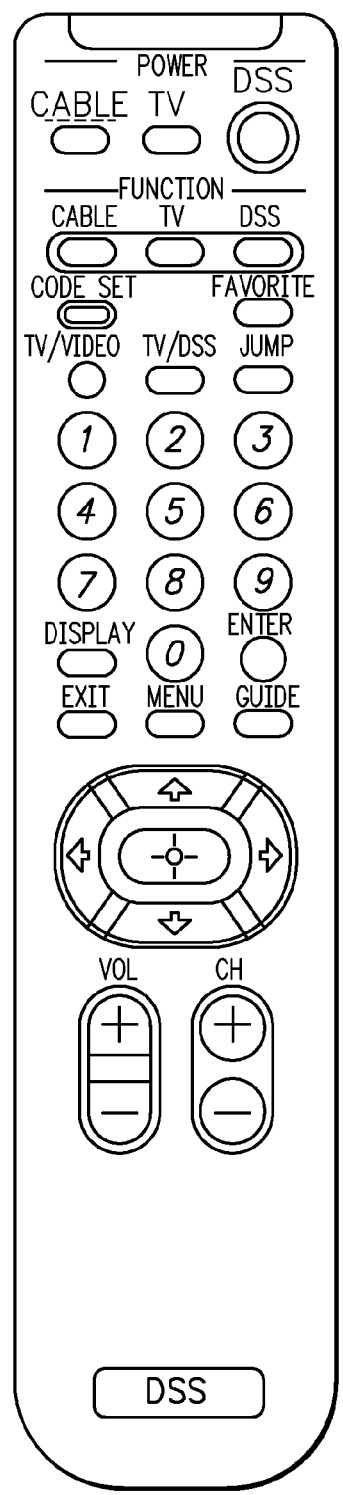
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device. The wireless I/O control device 226 can communicate with the entertainment system 200 using, e.g., an IR or RF transmitter or transceiver. Alternatively, the I/O control device can be connected to the entertainment system 200 via a wire. One or more hard drives (or disks) 280 can be provided for storage of recorded video, music or other media.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
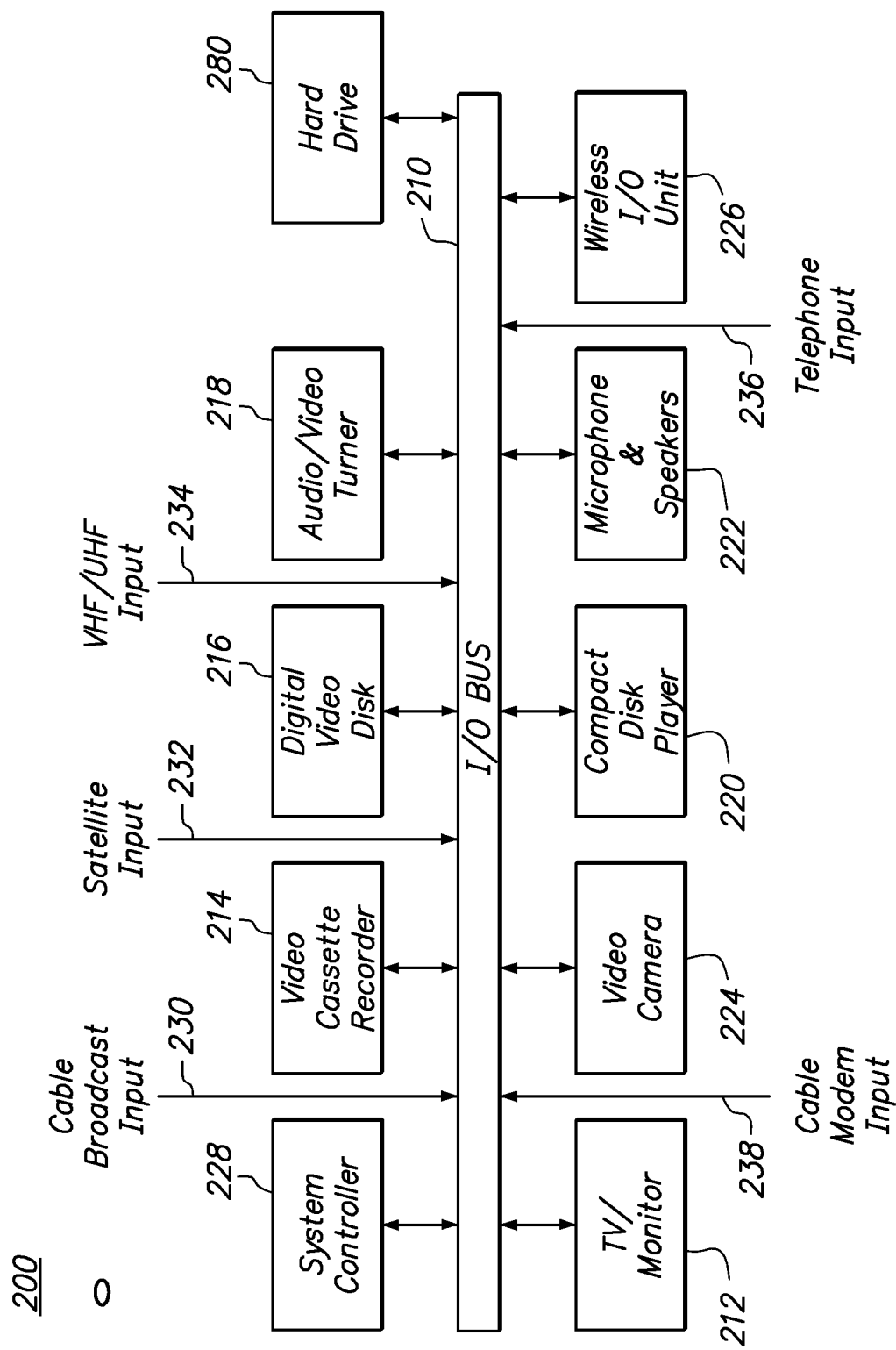
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. patent application entitled "A Control Framework with a Zoomable Graphical User Interface for Organizing, Selecting and Launching Media Items". Additionally, the interested reader is also referred to U.S. patent application Ser. No. 11/437,215, entitled "Global Navigation Objects in User Interfaces", filed on May 19, 2006, the disclosure of which is incorporated here by reference. Alternatively, remote devices and interaction techniques between remote devices and user interfaces in accordance with the present invention can be used in conjunction with other types of systems, for example computer systems including, e.g., a display, a processor and a memory system or with various other systems and applications.

Figure 3A:
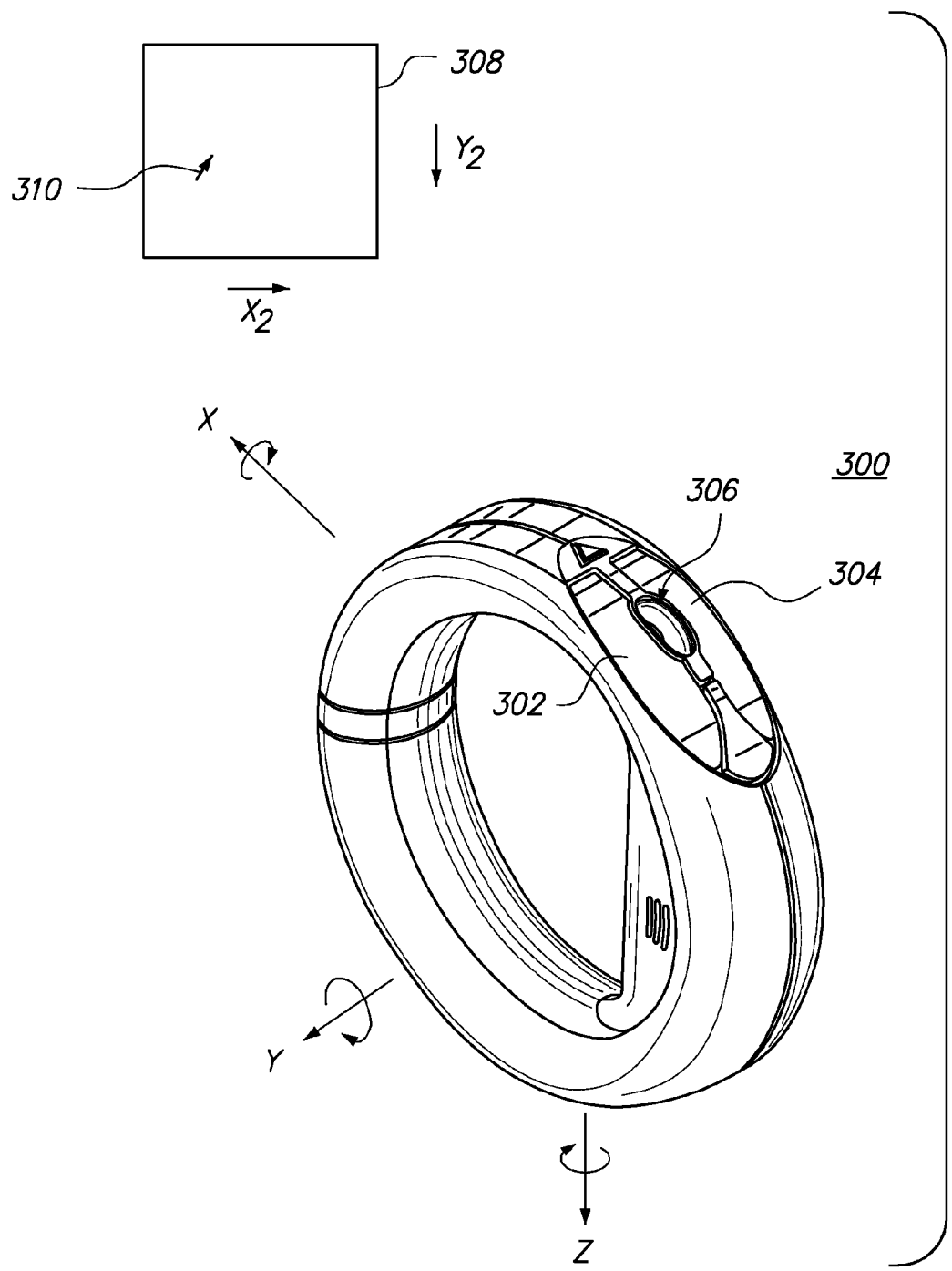
FIG. 3(a) shows a 3D pointing device according to an exemplary embodiment of the present invention.

As mentioned in the Background section, remote devices which operate as 3D pointers are of particular interest for the present specification, although the present invention is not limited to systems including 3D pointers. Such devices enable the translation of movement of the device, e.g., linear movement, rotational movement, acceleration or any combination thereof, into commands to a user interface. An exemplary loop-shaped, 3D pointing device 300 is depicted in FIG. 3(*a*), however the present invention is not limited to loop-shaped devices. In this exemplary embodiment, the 3D pointing device 300 includes two buttons 302 and 304 as well as a scroll wheel 306 (scroll wheel 306 can also act as a button by depressing the scroll wheel 306), although other exemplary embodiments will include other physical configurations. User movement of the 3D pointing device 300 can be defined, for example, in terms of rotation about one or more of an x-axis attitude (roll), a y-axis elevation (pitch) or a z-axis heading (yaw). In addition, some exemplary embodiments of the present invention can additionally (or alternatively) measure linear movement of the 3D pointing device 300 along the x, y, and/or z axes to generate cursor movement or other user interface commands. An example is provided below. A number of permutations and variations relating to 3D pointing devices can be implemented in systems according to exemplary embodiments of the present invention. The interested reader is referred to U.S. patent application Ser. No. 11/119,663, entitled (as amended) "3D Pointing Devices and Methods", filed on May 2, 2005, U.S. patent application Ser. No. 11/119,719, entitled (as amended) "3D Pointing Devices with Tilt Compensation and Improved Usability", also filed on May 2, 2005, U.S. patent application Ser. No. 11/119,987, entitled (as amended) "Methods and Devices for Removing Unintentional Movement in 3D Pointing Devices", also filed on May 2, 2005, U.S. patent application Ser. No. 11/119,688, entitled "Methods and Devices for Identifying Users Based on Tremor", also filed on May 2, 2005, and U.S. patent application Ser. No. 11/480,662, entitled "3D Pointing Devices", filed on Jul. 3, 2006, the disclosures of which are incorporated here by reference, for more details regarding exemplary 3D pointing devices which can be used in conjunction with exemplary embodiments of the present invention.

According to exemplary embodiments of the present invention, it is anticipated that 3D pointing devices 300 will be held by a user in front of a display 308 and that motion of the 3D pointing device 300 will be translated by the 3D pointing device into output which is usable to interact with the information displayed on display 308, e.g., to move the cursor 310 on the display 308. For example, such 3D pointing devices and their associated user interfaces can be used to make media selections on a television as shown in FIG. 3(*b*), which will be described in more detail below. Aspects of exemplary embodiments of the present invention can be optimized to enhance the user's experience of the so-called "10-foot" interface, i.e., a typical distance between a user and his or her television in a living room. For example, interactions between pointing, scrolling, zooming and panning, e.g., using a 3D pointing device and associated user interface, can be optimized for this environment as will be described below, although the present invention is not limited thereto.

Referring again to FIG. 3(*a*), an exemplary relationship between movement of the 3D pointing device 300 and corresponding cursor movement on a user interface will now be described. Rotation of the 3D pointing device 300 about the y-axis can be sensed by the 3D pointing device 300 and translated into an output usable by the system to move cursor 310 along the $y_2$ axis of the display 308. Likewise, rotation of the 3D pointing device 308 about the z-axis can be sensed by the 3D pointing device 300 and translated into an output usable by the system to move cursor 310 along the $x_2$ axis of the display 308. It will be appreciated that the output of 3D pointing device 300 can be used to interact with the display 308 in a number of ways other than (or in addition to) cursor movement, for example it can control cursor fading, volume or media transport (play, pause, fast-forward and rewind). Additionally, the system can be programmed to recognize gestures, e.g., predetermined movement patterns, to convey commands in addition to cursor movement. Moreover, other input commands, e.g., a zoom-in or zoom-out on a particular region of a display (e.g., actuated by pressing button 302 to zoom-in or button 304 to zoom-out), may also be available to the user.

According to exemplary embodiments of the present invention, user interfaces may use, at least in part, zooming techniques for moving between user interface views. The zooming transition effect can be performed by progressive scaling and displaying of at least some of the UI objects displayed on the current UI view to provide a visual impression of movement of those UI objects away from an observer. In another functional aspect of the present invention, user interfaces may zoom-in in response to user interaction with the user interface which will, likewise, result in the progressive scaling and display of UI objects that provide the visual impression of movement toward an observer. More information relating to zoomable user interfaces can be found in U.S. patent application Ser. No. 10/768,432, filed on Jan. 30, 2004, entitled "A Control Framework with a Zoomable Graphical User Interface for Organizing, Selecting and Launching Media Items", and U.S. patent application Ser. No. 09/829,263, filed on Apr. 9, 2001, entitled "Interactive Content Guide for Television Programming", the disclosures of which are incorporated here by reference.

Movement within the user interface between different user interface views is not limited to zooming. Other non-zooming techniques can be used, in addition to zooming or as an alternative thereto, to transition between user interface views. For example, panning can be performed by progressive translation and display of at least some of the user interface objects which are currently displayed in a user interface view. This provides the visual impression of lateral movement of those user interface objects to an observer.

Figure 3B:
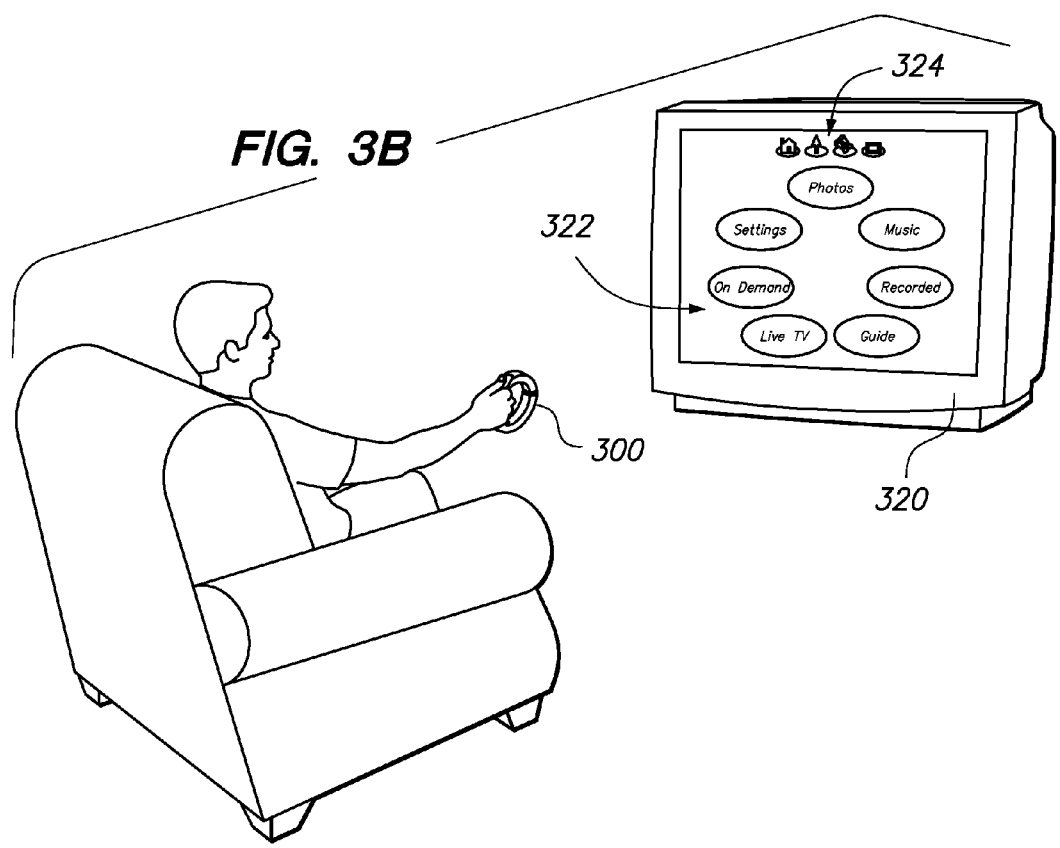
FIG. 3(b) illustrates a user employing a 3D pointing device to provide input to a user interface on a television according to an exemplary embodiment of the present invention.

Returning now to the application illustrated in FIG. 3(b), the GUI screen (also referred to herein as a "UI view", which terms refer to a currently displayed set of UI objects) seen on television 320 is a home view. In this particular exemplary embodiment, the home view displays a plurality of applications 322, e.g., "Photos", "Music", "Recorded", "Guide", "Live TV", "On Demand", and "Settings", which are selectable by the user by way of interaction with the user interface via the 3D pointing device 300. Such user interactions can include, for example, pointing, scrolling, clicking or various combinations thereof. For more details regarding exemplary pointing, scrolling and clicking interactions which can be used in conjunction with exemplary embodiments of the present invention, the interested reader is directed to U.S. patent application Ser. No. 11/417,764, entitled "METHODS AND SYSTEMS FOR SCROLLING AND POINTING IN USER INTERFACE", to Frank J. Wroblewski, filed on May 4, 2006, the disclosure of which is incorporated here by reference.

Pointing and TV User Interface Elements

Figure 3C:
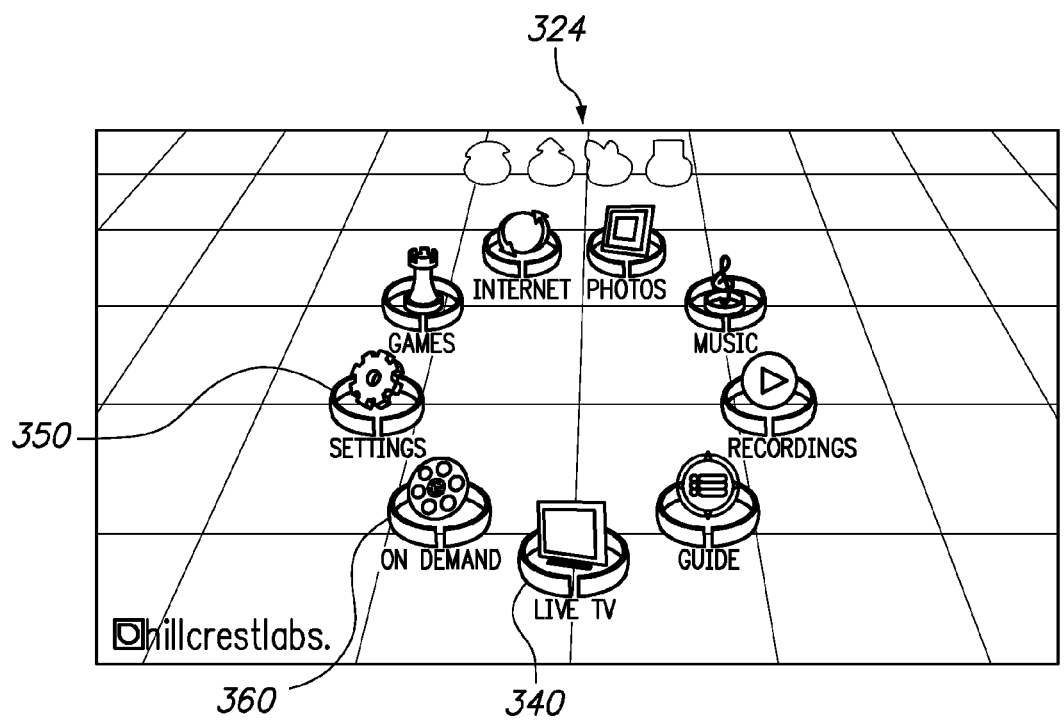
FIG. 3(c) illustrates a home UI view of a user interface according to an exemplary embodiment of the present invention.

As mentioned above, the provision of pointing capability as part of the input paradigm for TV user interfaces will result in new types of user interface elements and functionality which take advantage of this feature, exemplary embodiments of which are described herein. Starting with FIG. 3(c), another version of the "home" UI view of FIG. 3(b) is shown. Therein, the circle of initial selection elements in FIG. 3(c) is expanded to include a selection element for "Internet" and "Games" as compared to the version shown in FIG. 3(b), any of which can be selected by, for example, pointing to the appropriate selection element and pressing a button on the 3D pointing device 300. Of particular interest for this discussion are the "Live TV", "Settings", and "On Demand" selection elements 340, 350 and 360, respectively, illustrated in FIG. 3(c). Actuation of these selection elements provides one exemplary navigation path in these exemplary embodiments to the various media UI views which include the pointing interactive user interface elements described below, although it will be appreciated that other paths may be followed through the user interface to reach these UI views.

Figure 4A:
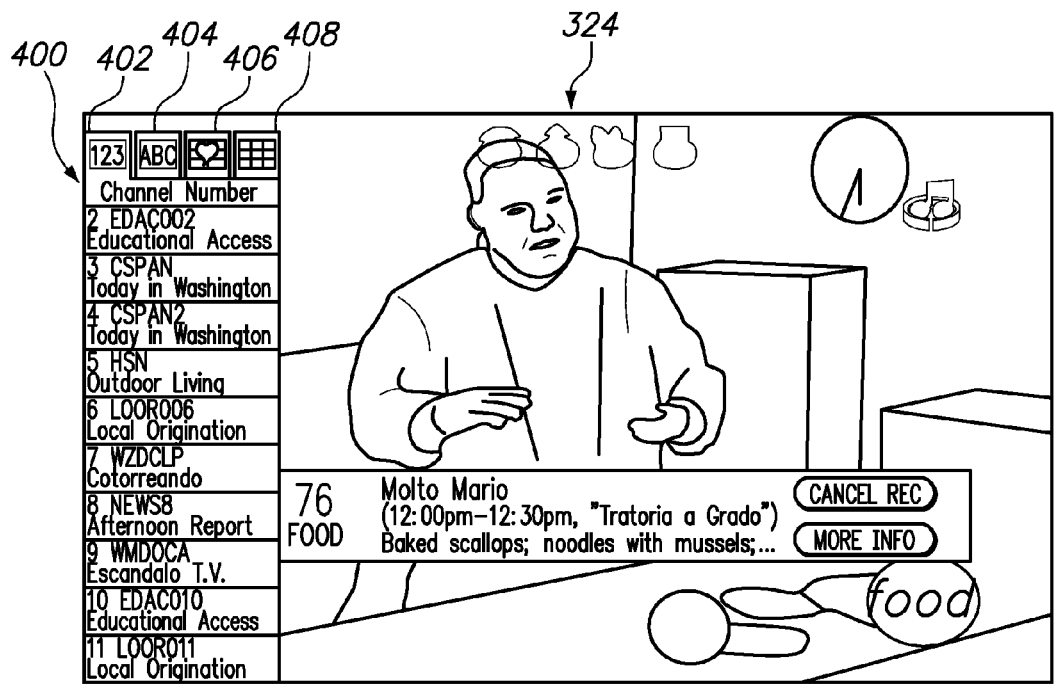
FIGS. 4(a)-4(d) illustrate user interface screens associated with TV control user interface elements and functionality according to an exemplary embodiment of the present invention.

For example, actuating selection element 340 via 3D pointer 300 could result in the display of the UI view shown in FIG. 4(a), e.g., a display of live TV programs on a television. Global navigation icons 324, described in the above-incorporated by reference patent application, are also available in ghosted image for quick and easy navigation away from the live TV functionality. Therein, a channel changing user interface element 400 can be displayed when, for example, a user moves a cursor toward the left-hand side of the television. The channel changing user interface element 400 can be displayed as an overlay on top of the live TV video feed which is ongoing. In this exemplary embodiment, the channel changing user interface element has four tabs 402, 404, 406 and 408. Each of these tabbed views of the channel changing user interface element will be described with respect to FIGS. 4(a)-4(d) respectively.

Beginning with the leftmost tab 402, this can be the default view of the user interface element when it is actuated and overlaid on top of the live TV or video feed. When selected, tab 402 provides for selectable channel numbers in numerical order, e.g., from the lowest numbered channel to the highest as shown in the exemplary embodiment of FIG. 4(a). Additionally, as shown, an alphanumeric identifier can be provided beside the channel number and a title or other indicator of the program which is currently playing on that channel can be provided below. If a user moves the 3D pointing device 300 to point at one of the channel entries illustrated in the tab 402 user interface element, and clicks for example a button on the 3D pointing device 300, the live TV feed will change to the program which is currently being broadcast or streamed on that channel.

Figure 4B:
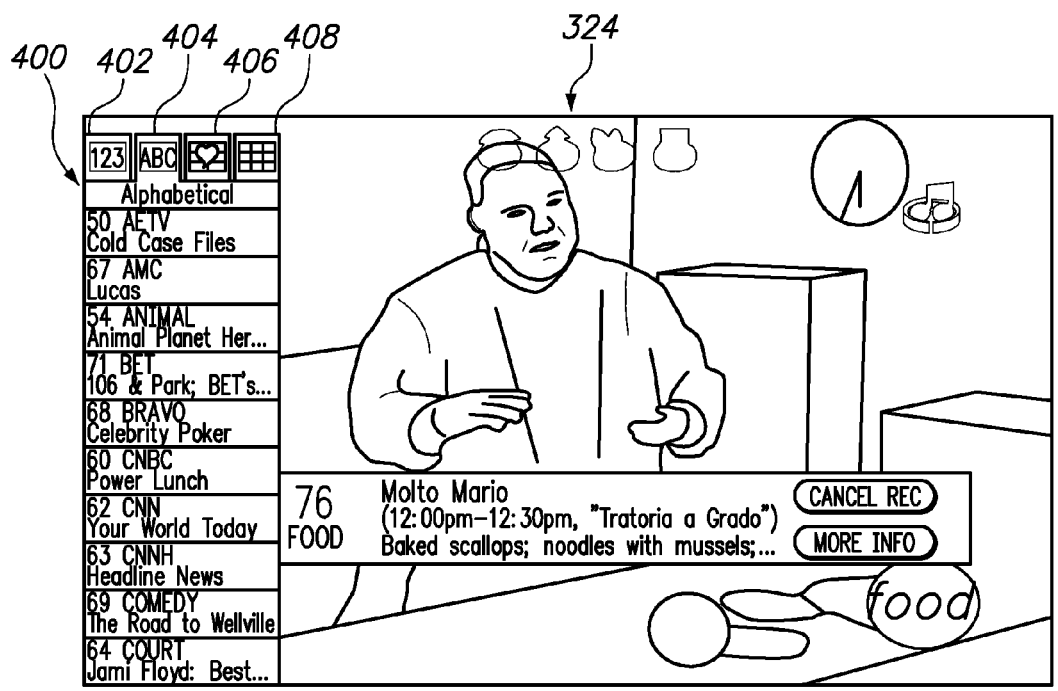

If the user points at the tab 404 and clicks or provides another selection input via the 3D pointing device 300, then a UI view such as that seen in FIG. 4(b) can be presented. Therein the user interface provides a listing of available channels which are alphabetical, e.g., alphabetized based upon the call sign or corresponding channel identifier. Again, the user may use this presentation of selectable channels in the same way to change the video source which is providing the video and audio information powering the live TV feed.

Figure 4C:
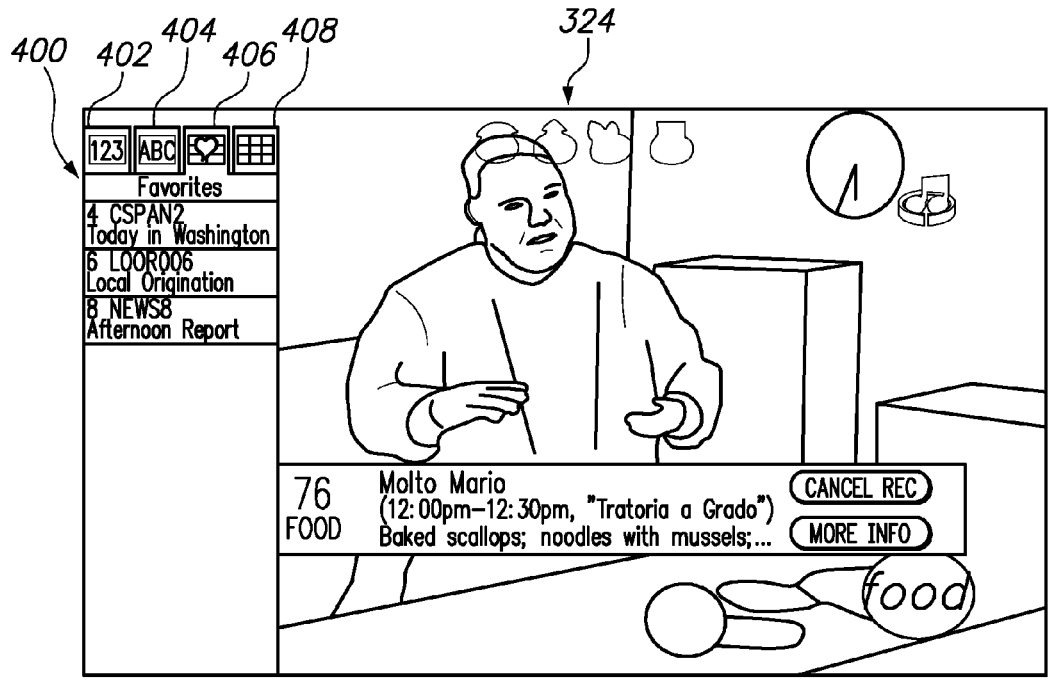
Figure 4D:
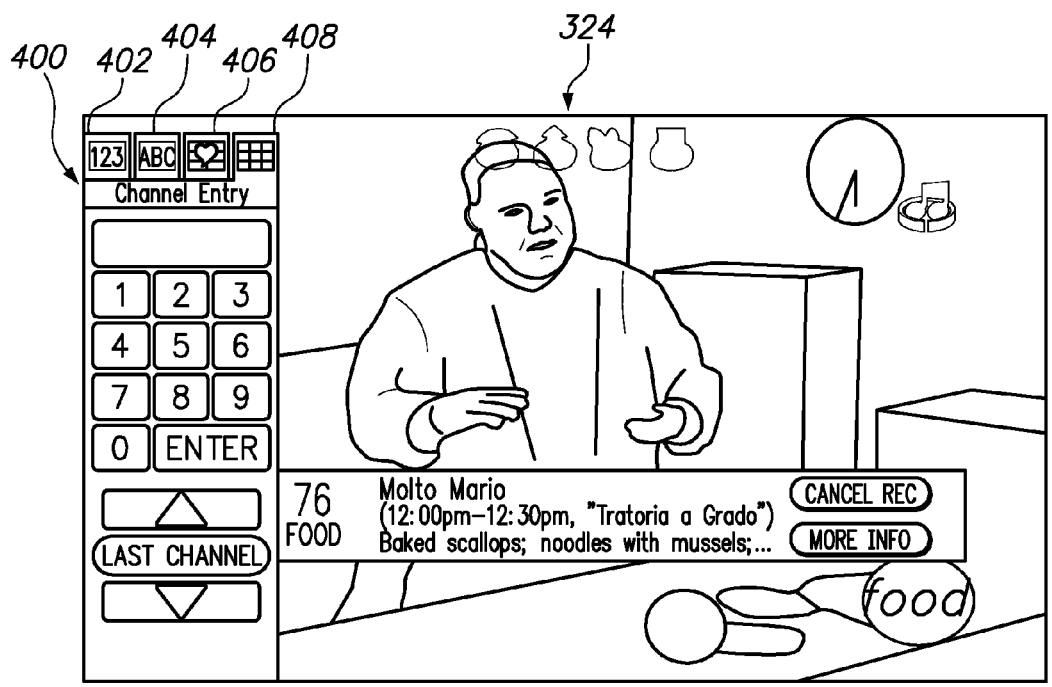
Figure 5A:
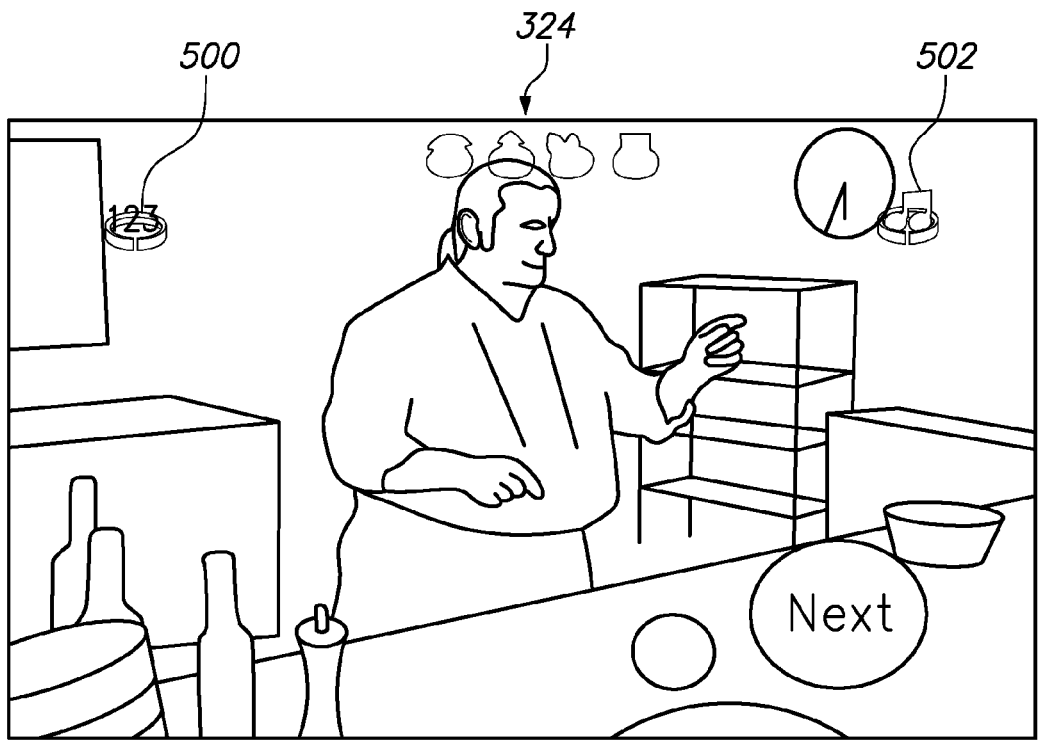
FIGS. 5(a)-5(d) illustrate user interface screens associated with TV control user interface elements and functionality according to another exemplary embodiment of the present invention.
Figure 5B:
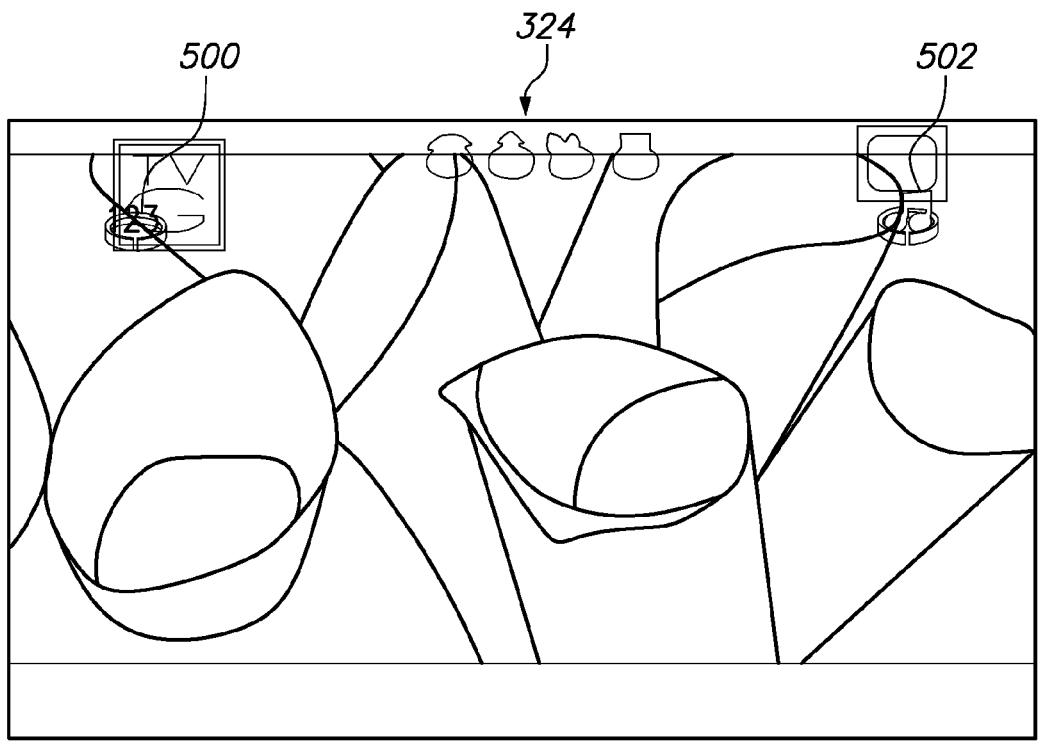
Figure 5C:
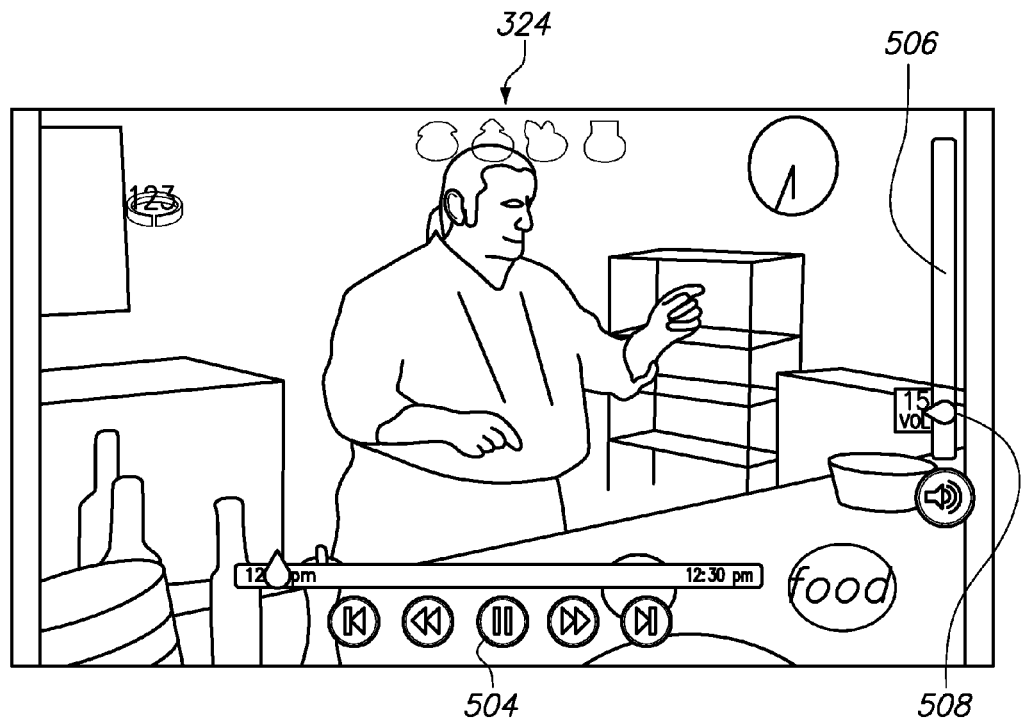
Figure 5D:
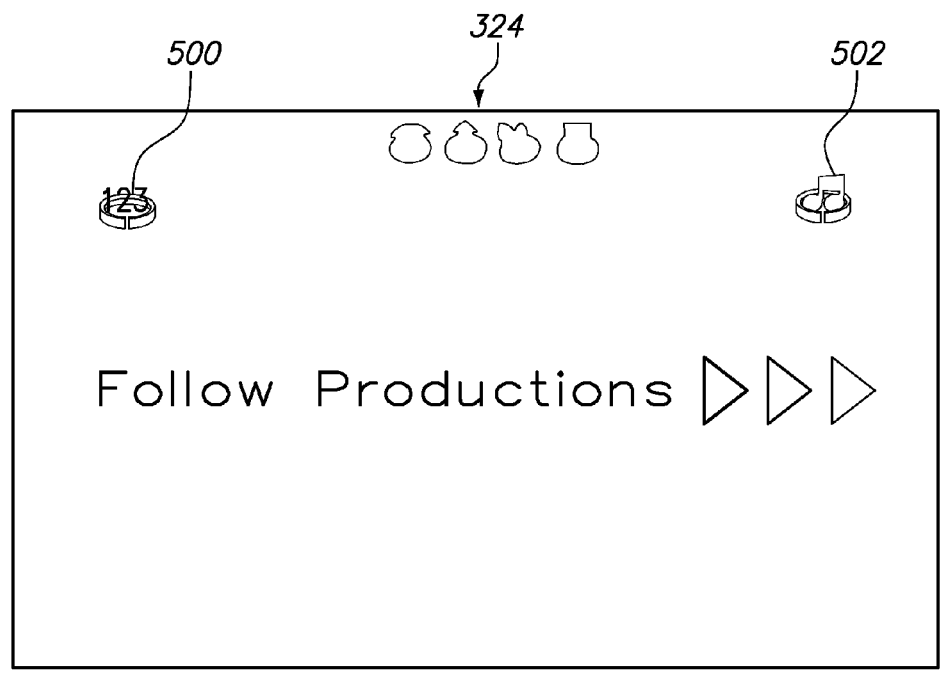
Figure 6A:
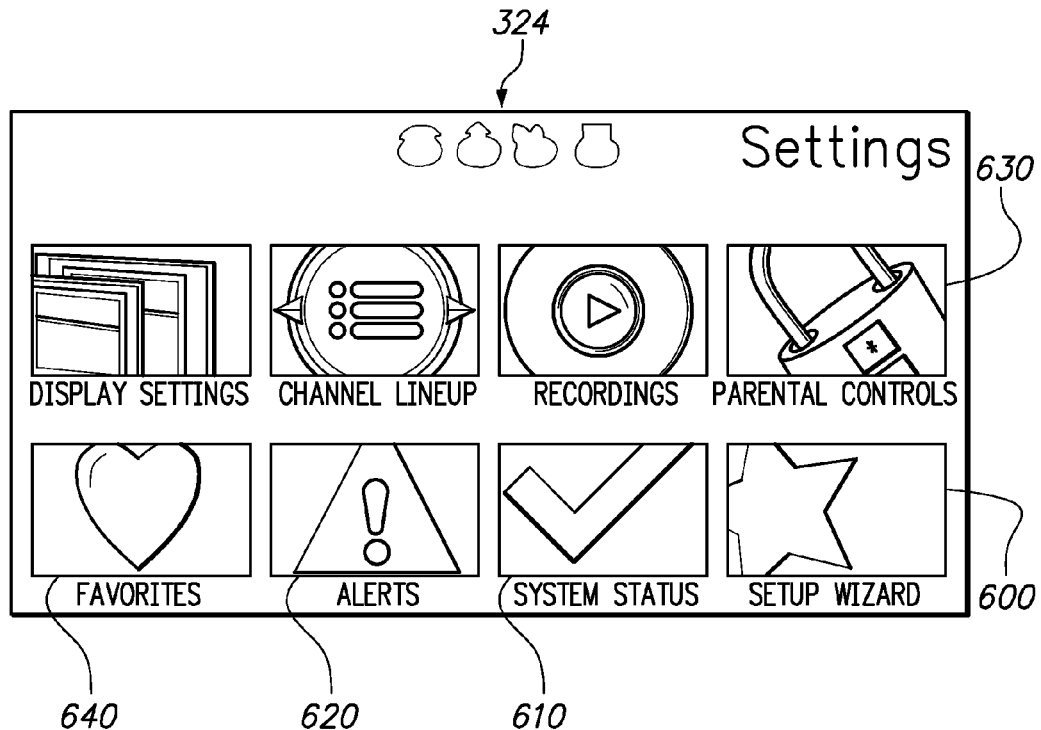
FIGS. 6(a)-6(k) illustrate user interface screens associated with TV control user interface elements and functionality according to yet another exemplary embodiment of the present invention.
Figure 6B:
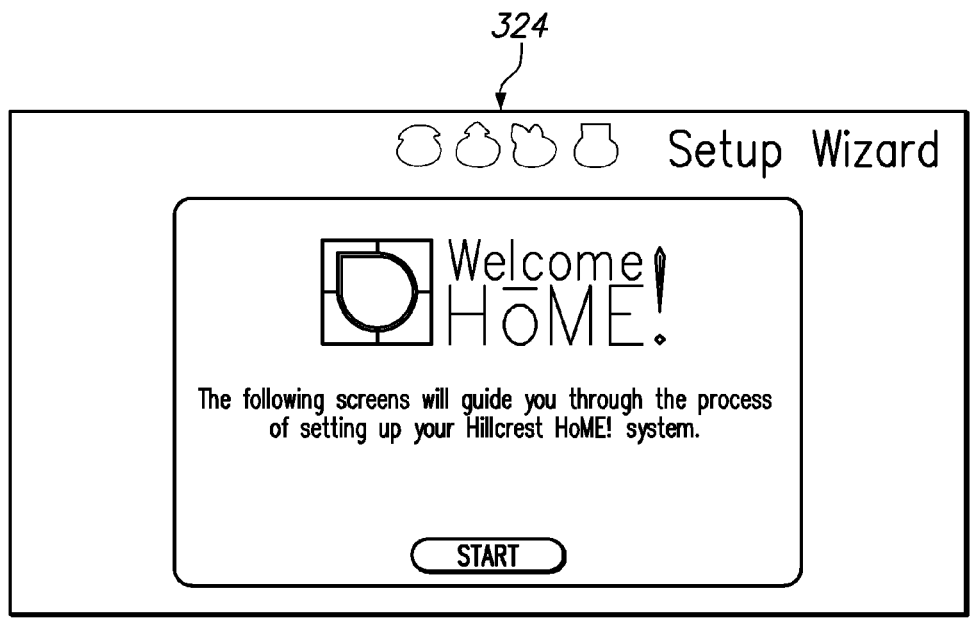
Figure 6C:
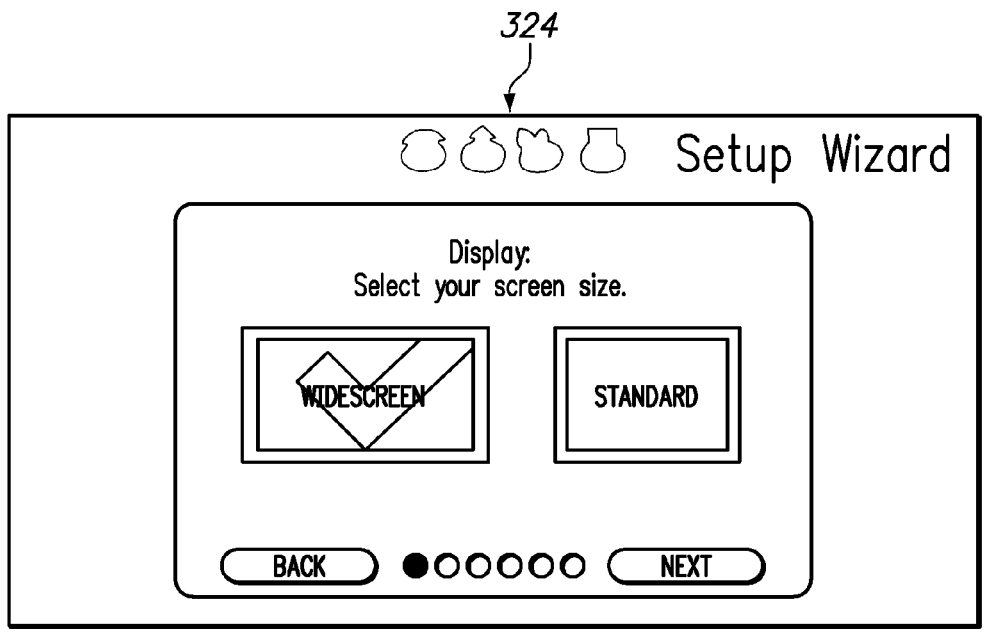
Figure 6D:
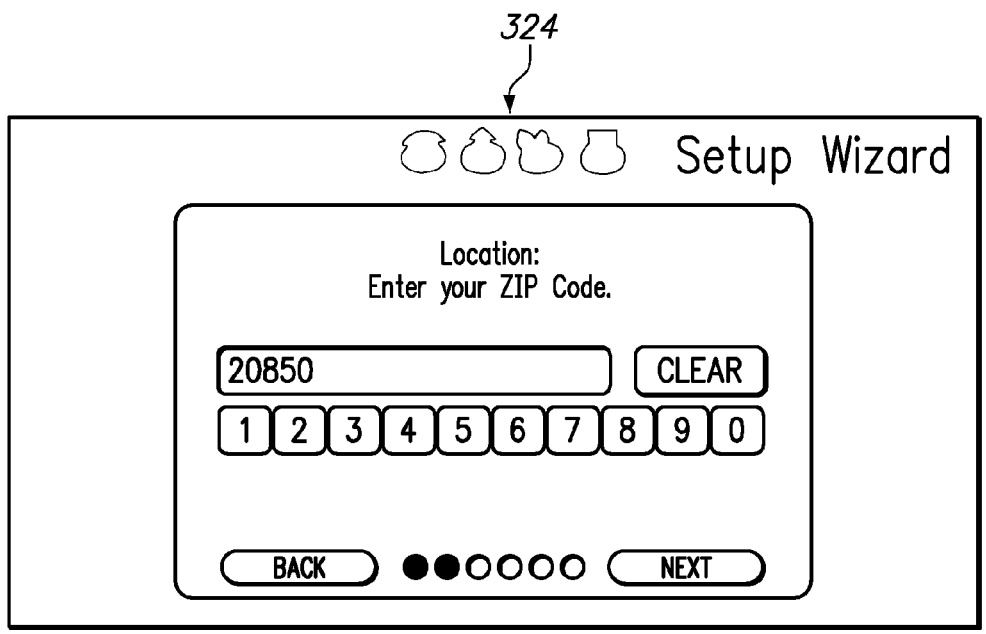
Figure 6E:
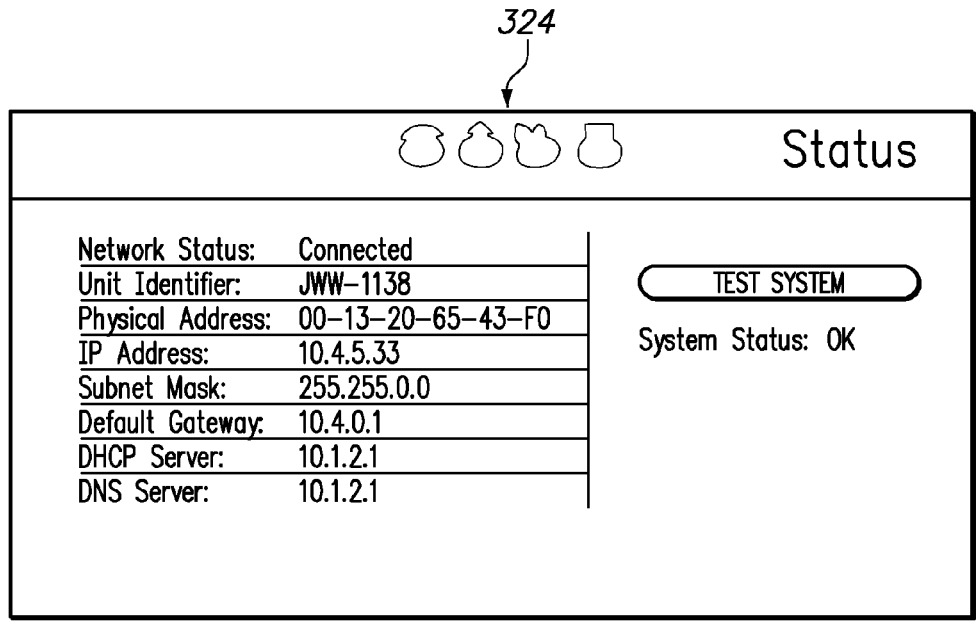
Figure 6F:
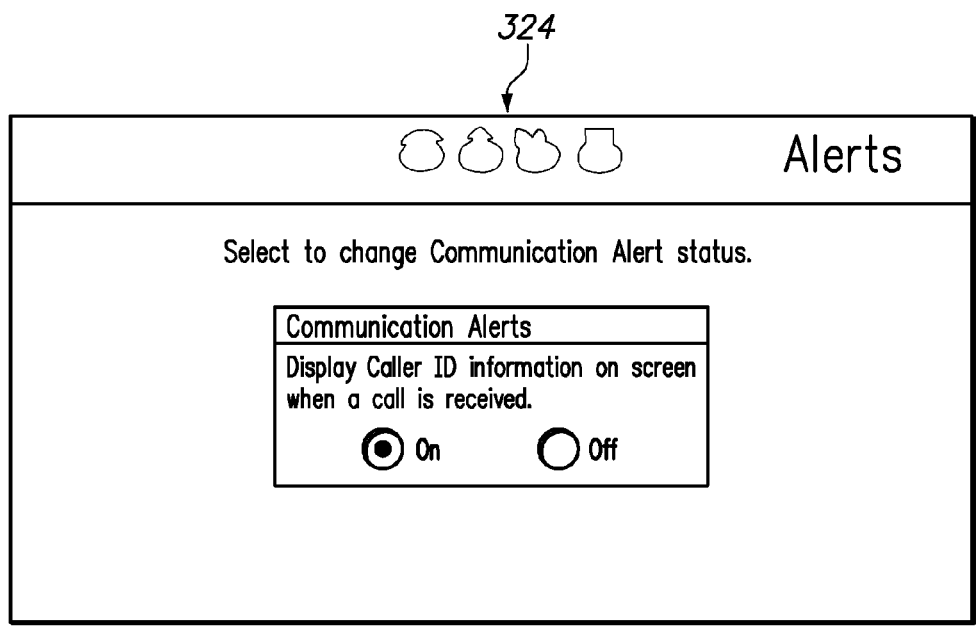
Figure 6G:
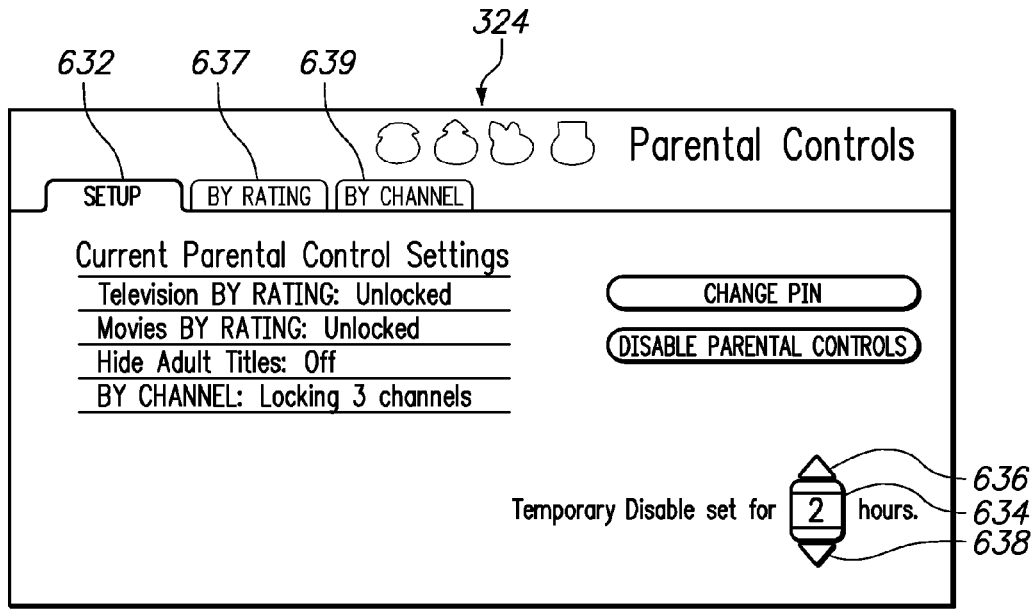
Figure 6H:
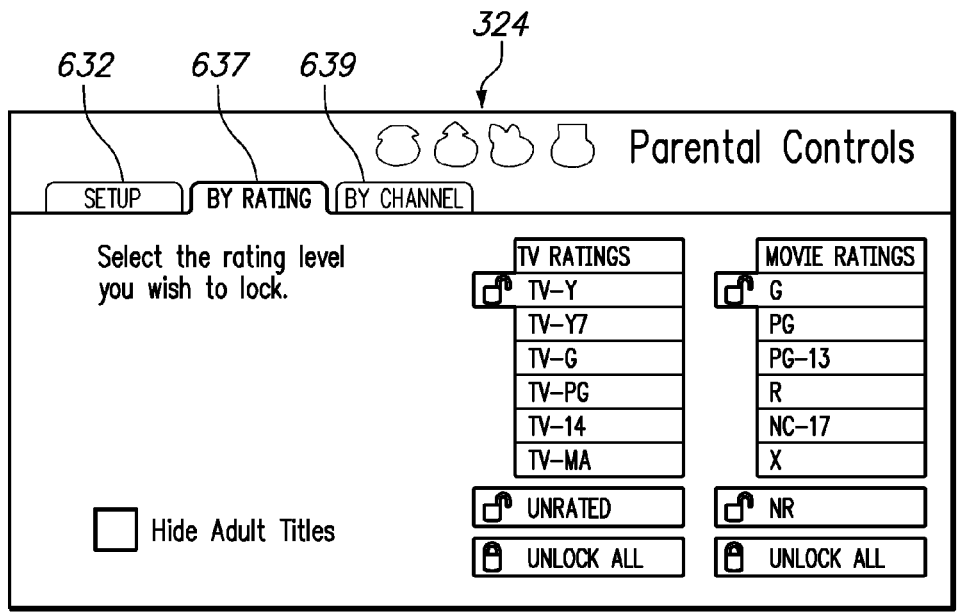
Figure 6I:
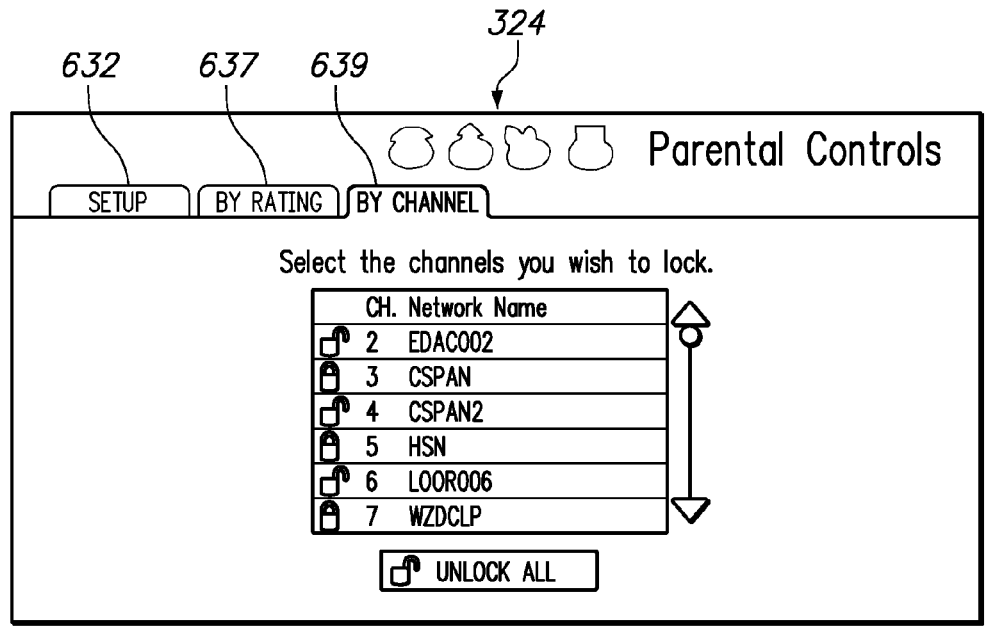
Figure 6J:
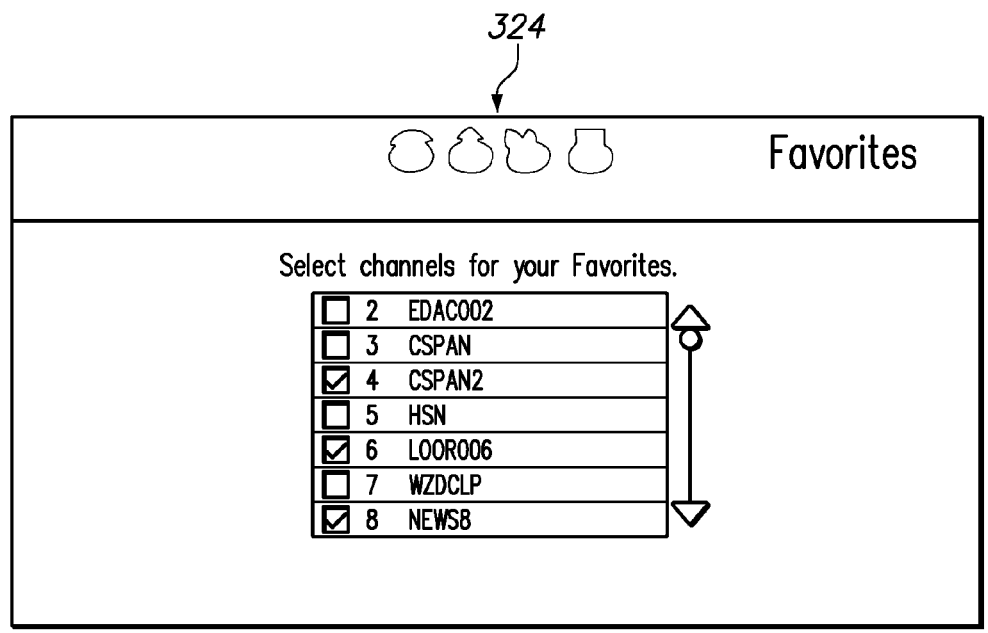
Figure 6K:
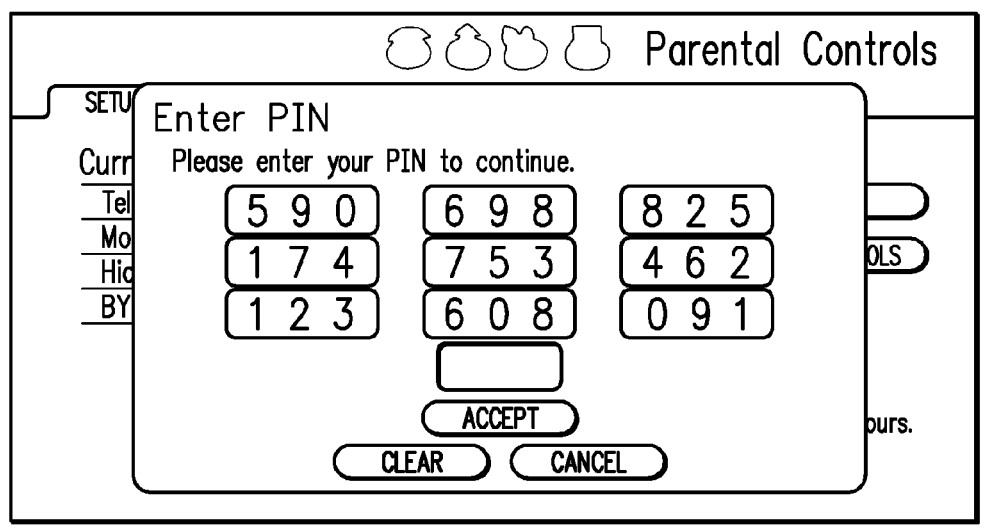

FIG. 4(c) illustrates an example where the user has clicked on the third tab 406. This tab presents channels which have been identified as "Favorites" by the user, thereby providing for a filtered list of fewer channels which can be provided as selections. A mechanism for selecting favorites is discussed below. Additionally, although not shown in FIG. 4(c), by pointing and clicking on, for example, the heart symbol illustrated within tab 406, a user can be provided with another screen which allows the currently viewed channel to be added to the list of favorites or other editing of the favorites list to be performed. Similarly, by pointing and selecting tab 408, the user is provided with a view of the channel selection element 400 similar to that shown, for example, in FIG. 4(d). Therein, channel entry may be performed by way of a keypad as shown. Using the pointer, each of the numeric buttons can be pressed whereupon a corresponding display will be provided in the display region. When the user is finished entering the channel number, she or he may click on the "Enter" button, by positioning the cursor thereover and actuating one of the buttons on the 3D pointing device 300. This results in, for example, the live video feed which is being displayed on the television changing to that associated with the newly entered channel number. Additionally, the tab 408 version of the user interface element for changing channels 400, also includes graphical up and down channel buttons which can be actuated by pointing and clicking as well as a "Last Channel" button.

In addition to channel changing user interface control elements, exemplary embodiments of the present invention provide for other types of user interface elements which take advantage of the pointing capability associated with these systems. For example, FIG. 5(*a*) illustrates another exemplary embodiment of wherein live TV is currently being viewed on the television. At the instant captured in this user interface view, all of the existing user interface elements are displayed in a "ghost" image, i.e., primarily transparent except for outlines having a translucent quality associated therewith. In this example of FIG. 5(*a*), those control elements include the four global navigation elements 324 described above, as well as live TV widget icons 500 and 502. The global navigation buttons are described in the above-incorporated by reference patent application in more detail and are, therefore, not further described here. Of more interest for the present application, are the icons 500 and 502 which enable a viewer to selectively activate overlay controls for controlling a live TV feed and/or providing DVR functionality as software overlays. For example, the icons 500 and 502 can generally be displayed in a ghosted form so as to minimize their impact on the underlying live TV feed. If, however, a user moves, for example, a 3D pointing device 300 such that a cursor (not shown) is positioned over one of the icons 500 and 502, the icon will light up or be filled in in order to indicate its selectable status. For example, as shown in FIG. 5(*b*), the icon 502 associated with volume and DVR controls is highlighted as a cursor is in the vicinity thereof. A user may then request that the user interface display the overlay controls, e.g., by pressing the button on the 3D pointing device 300, hovering the cursor over the icon 502 for a predetermined period of time, or any other actuation or selection mechanism. When this occurs, then according to exemplary embodiments, a DVR overlay 504 and volume control overlay 506 may appear on top of the live TV video feed displayed on the television. An example of this is shown in FIG. 5(*c*).

Therein, the DVR overlay controls generally referenced by reference numeral 504, include a series of five buttons having symbols thereon associated with DVR functionality including, from left to right, a "Next Segment Back" button, a "Rewind" button, a "Pause" button, a "Fast-Forward" button, and a "Next Segment Forward" button. As with the other controls described herein, a user can quickly and easily affect a DVR control on the TV by positioning a cursor (not shown) over any one of these DVR buttons and clicking thereon to issue an instruction to the user interface to perform the associated DVR functionality. The user interface will receive this command, interpret it as a DVR control command and perform the requested task. Similarly, the volume control overlay 506 illustrated in this exemplary embodiment provides several mechanisms whereby a user can point and click at the television to control the volume associated with the television program being output. For example, a user can drag the volume level indicator 508 up or down on the corresponding bar to raise or lower the volume accordingly. Similarly, the user may click at any position on the bar to automatically reposition the level indicator 508 at the point which is clicked on. The user interface will, again, interpret this as a command to adjust the television volume and control the television accordingly. FIG. 5(*d*) illustrates the case where a user has positioned a cursor on top of or in the vicinity of the channel changing icon 500. This, in turn, causes the user interface to highlight the icon 500 as compare to the global navigation icon 324 and 502 which remain in their ghosted form in this example. As mentioned above, highlighting the icon 500 indicates that it is selectable. The selection or actuation of this particular icon will result in the display of a channel changing overlay on top of the live TV feed. An example of channel changing mechanisms which can be provided as point and click overlays has been described above in FIGS. 4(*a*)-4(*d*).

In addition to providing powerful point and click overlay controls for live TV, the pointing paradigm associated with these exemplary embodiments provides for other ease of navigation type of media controls. Returning briefly to FIG. 3(*c*), actuation of the "Settings" icon 350, may result, for example, in the UI view illustrated in FIG. 6(*a*) being displayed. This UI navigational path provides a user with a convenient mechanism for adjusting various settings associated with the user interface and the replay of media. For example, pointing and clicking on the setup wizard icon 600 may result in the display of a UI view such as that illustrated in FIG. 6(*b*). The setup wizard can provide the user with an easy to navigate mechanism for setting up and configuring various aspects of his or her television system using a pointing device. For example, as shown in FIG. 6(*c*), the user can point and click on the screen size associated with the television being used in the system. Similarly, in FIG. 6(*d*), a user can enter his or her zip code using a numeric keypad displayed on the television to facilitate point and click data entry.

Similarly, returning to FIG. 6(*a*), pointing and clicking on the system status icon 610 may result in, for example, the display of the UI view such as that illustrated in FIG. 6(*e*) which provides information associated with the user's system. Alerts may be provided via icon 620 in FIG. 6(*a*) which can result in the display of a UI view such as that shown in FIG. 6(*f*). For example, FIG. 6(*f*) provides a user selectable, via point and click mechanism, ability to display caller ID on the television screen when a phone call is received.

Actuating the parental controls button 630 in FIG. 6(*a*) may result in the display of various UI views, examples of which are illustrated beginning with FIG. 6(*g*). As seen in FIG. 6(*g*), this exemplary point and click parental control user interface provides a three tabbed approach. In the first tab, 632, setup features are provided for point and click manipulation by a user. Parental controls can be temporarily disabled via the counter 634, by pointing and clicking at the up or down buttons 636 and 638, respectively. The status of various types of parental control settings according to these exemplary embodiments are also displayed under the setup tab 632. For example, parental control settings by rating can be locked or unlocked. These parental controls can be accessed by pointing and clicking on the tab "By Rating" 637. Actuating this tab in the parental tab UI view, may result in the display of the UI view such as that illustrated in FIG. 6(*h*). Therein, a user can lock or unlock TV programs or movies based upon their rating by pointing and clicking at the ratings illustrated on the screen. Alternatively, a user can lock individual channels by accessing tab 639. Pointing and clicking at tab 639 can, for example, result in the display of a UI view like that illustrated in the example of FIG. 6(*i*). Therein, a user can point and click at entries associated with individual channels to lock or unlock the controls associated therewith. The user interface will then only permit the channels which are unlocked to be displayed on the television.

Actuating the "Favorites" icon 640 in FIG. 6(*a*) may result in the display of a UI view such as that illustrated in FIG. 6(*j*). Therein, a user can point and click at checkboxes associated with individual channels to populate a favorites list. The list can be scrolled using the scroll arrows or bar positioned, in this example, to the right of the channel list. Actuating the "Change PIN" button in FIG. 6(*g*) by positioning the cursor thereover and actuating a button on a pointing device, for example, may result in the display of the UI view shown in FIG. 6(*k*). Therein, a user is provided with the facility for entering a numerical PIN number.

According to another exemplary embodiment, the live TV feed described earlier with respect to FIGS. 4(*a*)-4(*d*) and 5(*a*)-5(*d*) can be easily paused. For example, the user interface can interpret a point and click on any portion of the live TV feed, e.g., other than the portions associated with overlay controls, as a request to pause the display of the program. This provides the user with a very convenient mechanism for pausing a program's display if, for example, she or he needs to leave the living room.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A television system comprising: a television;
a user interface for controlling output of media via the television, the user interface being displayed on the television and including a user interface view which enables a user to change settings associated with the user interface; and
a pointing device for providing pointing and selection inputs to the user interface by interacting with the user interface view to enable selection of settings for the user interface,
wherein the settings include parental controls, displaying caller identification (ID) information on the television and favorite channels,
further wherein the user interface view further comprises at least a first tab element and a second tab element displayed simultaneously on the user interface view;
wherein selection of the first tab element displays a first tabbed overlay displaying channels for selection in a first order; and
wherein selection of the second tab element displays a second tabbed overlay displaying the same channels listed in the first tabbed overlay for selection in a second order different from the first order,
further wherein one of the first order or the second order displays the same channels for selection in an alphabetical order and another of the first order or the second order displays the same channels for selection in a numerical order,
further wherein selection of a third tab displayed on the user interface provides channel entry by way of a ten digit numeric keypad, wherein the ten digit numeric keypad including an enter button; is displayed on the user interface with a corresponding channel number display area, further wherein by pointing at and clicking on an individual numeral displayed on the ten digit numeric keypad, the selected individual numeral is displayed in the corresponding channel number display area and after the user selects the desired numeral(s), a channel number corresponding to the selected numeral(s) is displayed in the channel number display area, wherein by pointing at and clicking on the enter button, the user changes a channel.

2. The television system of claim 1, wherein the parental controls include setting of a personal identification number (PIN).

3. The television system of claim 1, wherein selection of a fourth tab displayed on the user interface view provides a listing of favorite channels and when the favorite channels setting is active, a currently viewed channel can be added to the favorite channels setting by pointing and clicking on a symbol associated with the favorite channels settings.

4. The television system of claim 1, wherein the user interface is displayed when said user moves a cursor by moving the pointing device toward the left-hand side of the television.

5. The television system of claim 1, wherein currently viewable interface elements are transparent except for the outlines of the currently viewable interface elements which are translucent.

6. The television system of claim 1, wherein the parental controls are associated with the rating of a show, further wherein only shows with allowed ratings are viewable on the television.

7. A method for controlling a television, the method comprising:
displaying a user interface for controlling output of media via the television the user interface being displayed on the television and including a user interface view which enables a user to change settings associated with the user interface; and
receiving pointing and selection inputs to the user interface to enable selection of settings for the user interface,
wherein the settings include parental controls, displaying caller identification (ID) information on the television and favorite channels,
further wherein the user interface view further comprises at least a first tab element and a second tab element displayed simultaneously on the user interface view;
wherein selection of the first tab element displays a first tabbed overlay displaying channels for selection in a first order; and
wherein selection of the second tab element displays a second tabbed overlay displaying the same channels listed in the first tabbed overlay for selection in a second order different from the first order, further wherein one of the first order or the second order displays the same channels for selection in an alphabetical order and another of the first order or the second order displays the same channels for selection in a numerical order, further wherein selection of a third tab displayed on the user interface provides channel entry by way of a ten digit numeric keypad, wherein the ten digit numeric keypad including an enter button, is displayed on the user interface with a corresponding channel number display area, further wherein by pointing at and clicking on an individual numeral displayed on the ten digit numeric keypad, the selected individual numeral is displayed in the corresponding channel number display area and after the user selects the desired numeral(s), a channel number corresponding to the selected numeral(s) is displayed in the channel number display area, wherein by pointing at and clicking on the enter button, the user changes a channel.

8. The method of claim 7, wherein the parental controls include setting a personal identification number (PIN).

9. The method of claim 7, wherein selection of a fourth tab displayed on the user interface view provides a listing of favorite channels and when the favorite channels setting is active, a currently viewed channel can be added to the favorite channels setting by pointing and clicking on a symbol associated with the favorite channels settings.

10. The method of claim 7, further comprising:
moving the pointing device toward the left-hand side of the television to display the user interface.

11. The method of claim 7, wherein currently viewable interface elements are transparent except for the outlines of the currently viewable interface elements which are translucent.

12. The method of claim 7, wherein the parental controls are associated with the rating of a show, further wherein only shows with allowed ratings are viewable on the television.

13. A television system comprising:
a television configured to display media, wherein the media includes a television program and an overlayable user interface;
the user interface for controlling output of media via the television, the user interface being displayed on the television and including a user interface view which enables a user to change settings associated with the user interface, wherein the user interface view provides channel entry by way of a ten digit numeric keypad, wherein the ten digit numeric keypad including an enter button is displayed on the user interface with a corresponding channel number display area, further wherein by pointing at and clicking on an individual numeral displayed on the ten digit numeric keypad, the selected individual numeral is displayed in the corresponding channel number display area and after the user selects the desired numeral(s), a channel number corresponding to the selected numeral(s) is displayed in the channel number display area, wherein by pointing at and clicking on the enter button, the user changes a channel; and
a pointing device for providing pointing and selection inputs to the user interface by interacting with the user interface view to enable selection of settings for the user interface, further wherein the user interface view further comprises at least a first tab element and a second tab element displayed simultaneously on the user interface view;

wherein selection of the first tab element displays a first tabbed overlay displaying channels for selection in a first order; and wherein selection of the second tab element displays a second tabbed overlay displaying the same channels listed in the first tabbed overlay for selection in a second order different from the first order, further wherein one of the first order or the second order displays the same channels for selection in an alphabetical order and another of the first order or the second order displays the same channels for selection in a numerical order.

14. The television system of claim 13, wherein the user interface is displayed when a user moves a cursor by moving the pointing device toward the left-hand side of the television, further wherein currently viewable interface elements are transparent except for the outlines of the currently viewable interface elements which are translucent.

* * * * *